United States Patent [19]
Schneider

[11] 3,866,346
[45] Feb. 18, 1975

[54] FISHING FLOAT

[76] Inventor: Vernon J. Schneider, Licking Pike, Alexandria, Ky. 41001

[22] Filed: July 13, 1972

[21] Appl. No.: 271,288

[52] U.S. Cl.............................. 43/44.87, 43/44.94
[51] Int. Cl............................................. A01k 93/00
[58] Field of Search............ 43/44.87, 44.92, 44.94, 43/44.95, 42.08

[56] References Cited
UNITED STATES PATENTS

| | | | |
|---|---|---|---|
| 351,523 | 10/1886 | Pflueger | 43/44.94 |
| 2,163,483 | 6/1939 | Carlisle | 43/44.95 |
| 2,496,334 | 2/1950 | Chapman | 43/44.95 X |
| 2,560,129 | 7/1951 | Rhotehamel | 43/44.95 |
| 2,842,888 | 7/1958 | Landrum | 43/44.95 |

FOREIGN PATENTS OR APPLICATIONS

| | | | |
|---|---|---|---|
| 1,130,880 | 10/1956 | France | 43/44.92 |
| 371 | 0/1913 | Great Britain | 43/44.92 |

*Primary Examiner*—James H. Czerwonky
*Attorney, Agent, or Firm*—John G. Schenk

[57] ABSTRACT

A fishing float with a buoyant member mounted on a stem and having a fixed line condition and a slip line condition is disclosed. The stem is provided with a transverse line receiving slot through which the fishing line is inserted. A coiled spring is exteriorly mounted on the stem to cooperate with a suitable lock groove on the float to permit use of the float in either line condition.

14 Claims, 7 Drawing Figures

PATENTED FEB 18 1975   3,866,346

FISHING FLOAT

BACKGROUND OF THE INVENTION

This invention relates to fishing floats and more particularly to a fishing float having means for fixedly clamping or slidably attaching the float to a fishing line.

In fishing, it is often desirable to be able to change from a fixed depth of fishing to a different depth of fishing as different conditions arise or when desiring to fish for a different type fish. When fishing at a shallow depth, it is no problem to utilize a float or bobber on the line. One might consider a shallow depth to be 2 to 3 feet and it is readily apparent that such a length of line extending beyond the float does not pose any problem with a person using a reel type fishing equipment wherein casting is required. However, should the person wish to deep fish, such as 10 to 15 feet below the float, a problem exists. The novice fishermen and even many experienced fishermen have difficulty in casting with a rod and reel when 10 to 15 feet of line extends beyond the float.

It will be further appreciated that if the float is anchored on the line at a distance greater from the hook than the length of the fishing rod, difficulty is experienced in landing a fish and in manipulation of the rig in general. This stems from the fact that if the float is fixedly anchored to the line, upon reeling in, the float contacts the rod tip and prohibits further reeling, thereby making it inconvenient to draw the fish as close to the rod tip as may be desirable for landing purposes.

Various types of fishing floats have been proposed to permit adjusting the buoyant action of the float assembly and to facilitate reeling-in of the line to the degree required for convenience in landing fish. Such prior floats have not proven to be entirely satisfactory because of the elaborate and expensive mechanism often provided to vary the buoyancy and because the means provided for adjustably clamping and slidably attaching the float to the line often induced, in operation, damage to the fishing line.

Accordingly, it is an object of this invention to provide a fishing float having a fixed line condition and a slip line condition and means for changing from one condition to the other condition.

A further object of this invention is to provide a fishing float that is simple and yet readily adjustable as to buoyant effect and positioning along the fishing line.

A still further object of this invention is to provide a fishing float to which the line may be easily attached to and released therefrom.

A still further object of this invention is to provide a fishing float having locking means to lock the float in either the fixed line condition or the slip line condition.

And yet another object of this invention is to provide a fishing float which is of simple and economical construction and is easy to operate.

SUMMARY OF THE INVENTION

This invention provides a fishing float having a fixed line condition and a slip line condition. The float stem is formed with a line receiving slot open at the side for receiving the fishing line therein. A coiled spring is mounted on the stem and one end constitutes a means for binding the line against the stem in the fixed line condition. A suitable lock groove formed in the stem cooperates with the other end of the spring to hold the spring in the fixed line condition or in a second position wherein the spring is not clamping the line to the stem such that the float is in the slip line condition.

Other objects, details, uses and advantages of this invention will become apparent as the following description of the exemplary embodiments thereof presented in the accompanying drawings proceeds.

BRIEF DESCRIPTION OF THE DRAWINGS

The accompanying drawings show present exemplary embodiments of this invention in which.

DESCRIPTION OF ILLUSTRATED EMBODIMENTS

Figure 1:
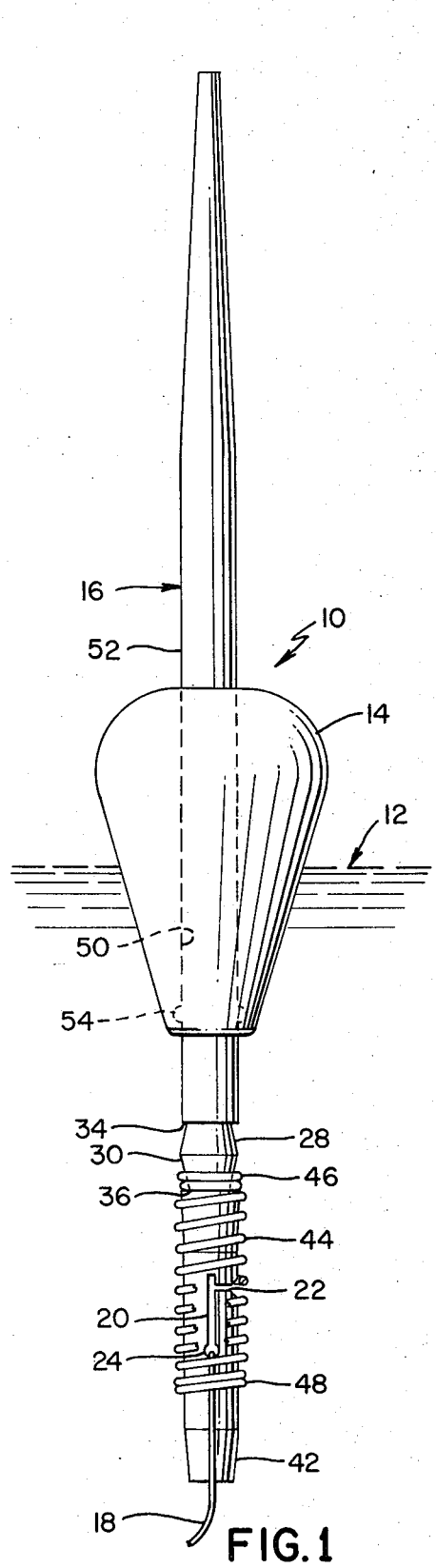
FIG. 1 is a view in side elevation of the fishing float embodied in this invention showing the float in the fixed line condition.

Reference is now made to FIG. 1 of the drawings which illustrates one exemplary embodiment of the improved fishing float of this invention, which is designated generally by the reference numeral 10. The float 10 is shown floating upright in a body of water 12 and is comprised of a float or bobber 14 and a stem 16 through which a fishing line 18 passes.

The stem 16 is formed with a longitudinal slot 20 (FIG. 2) extending along the axis of the stem 16. A lateral slot 22 intercepts the slot 20 at a point intermediate the ends thereof. The slot 22 extends through the side of the stem 16 to provide communication between the slot 20 and the outside environment. One end of the slot 20 is formed of a slightly enlarged bore, this bore being larger than the fishing line which is used. The fishing line 18 is connected to the stem 16 by inserting the line 18 through the slot 22 to the slot 20.

Figure 2:
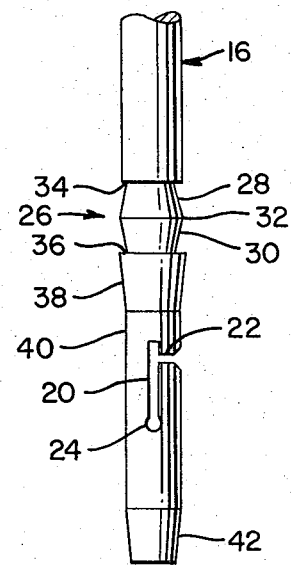
FIG. 2 is a fragmentary side elevation of the stem.

A suitable lock groove designated generally as 26 is formed in the stem above the slot 20 as best seen in FIG. 2. The lock groove 26 is provided with tapered surfaces 28 and 30, the surfaces 28 and 30 meeting at a high point 32. The other ends of the tapered surfaces 28 and 30 respectively terminate at shoulders 34 and 36. The diameter of the shoulders 34 and 36 is greater than the diameter of the high point 32 for reasons which will become apparent hereinbelow. The stem 16 is provided with a slight taper 38 extending from the shoulder 36 to a uniform diameter portion 40. The end 42 of the stem 16 is also formed in a taper to facilitate ease of sliding a spring 44 onto the stem 16.

As best seen in FIG. 1, the coiled spring 44 is formed with convolutions 46 at one end that have a smaller diameter than the remainder of the spring 44. The remaining coils of the spring 44 are of a slightly greater diameter than the diameter of the stem portion 40. When mounted on the stem, the convolutions 46 are placed in the tapered lock groove 26. The spring 44 is of such a length that in the fixed line condition the spring extends below the line bore 24 and in the slip line condition the spring ends above the bore 24. When mounting the spring 44 onto the stem 16, the convolutions 46 are expanded as the convolutions are passed up the taper 38 and onto the tapered portion 30 at which point the convolutions 46 again assume their initial diameter.

Figure 3:
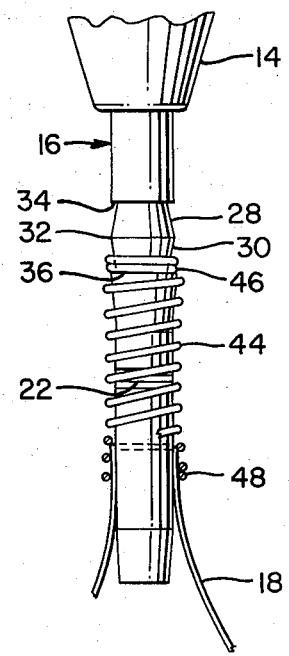
FIG. 3 is a fragmentary side elevation of the float of FIG. 1 revolved 90°.
Figure 4:
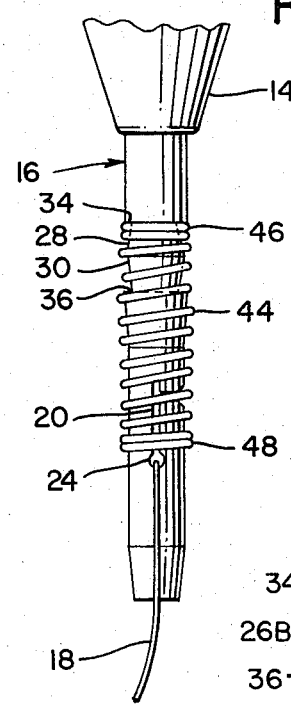
FIG. 4 is a fragmentary side elevation showing the float in the slip line condition.

The taper 30 urges the convolutions 46 against the shoulder 36 in the fixed line condition as will be explained herebelow. When it is desired to utilize the float 10 in the slip line condition, the convolutions 46 are readily manipulated to be moved from the position shown in FIGS. 1 and 3 to the position shown in FIG. 4. Movement of the convolutions 46 over the high point 32 is enhanced by imparting a quarter turn to the convolutions as the upward pressure is exerted thereon. When the spring 44 is in the position shown in FIG. 4, the tapered portion 28 urges the convolutions 46 against the shoulder 34 to maintain the spring 44 in the slip line condition.

Figure 5:
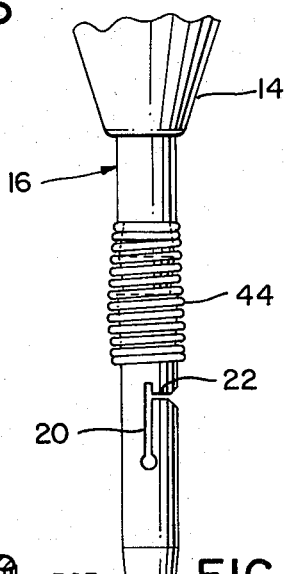
FIG. 5 is a side elevational view showing the float in the line receiving position.

When it is desired to attach the line 18 to the stem 16, the spring 44 is compressed so that it will not surround any portion of the slot 20 as shown in FIG. 5. While the spring 44 is thus compressed, the line 18 is inserted laterally through the slot 22 and into the slot 20. The line 18 will come to rest in the bore 24. When the spring 44 is released, the spring 44 will stop just above the bore 24 so that the float 10 will be in the slip line condition, the convolutions 46 being urged against shoulder 34 by the taper portion 28. In this condition, the line 18 is free to pass through the stem 16. Thus, if a person wishes to fish at a depth of 12 feet, it is only necessary to make a slip knot or the like in the line 18 at the desired point. In this way, the line can be completely reeled in until the hook or sinker engages the float and the float will be stopped at the tip of the rod. In casting, there is no excess line to be worried about and when the float hits the water 12, the float will stop while allowing the sinker and hook to travel downward through the water to the desired depth. The line is stopped at the desired depth when the knot, which is larger that the bore 24, reaches the float 10. It may be noted in FIG. 2 that the longitudinal slot 20 extends above the lateral slot 22. Should the line 18, when the float is in the slip line condition, rise up the slot 20 due to action of the water, the line 18 will not slide out the lateral slot 22 but will continue upward in the slot 20 to abut the end thereof.

If it is desired to fish at a fixed or shallow depth, the convolutions 46 are urged downward over the high point 32 to abut the shoulder 36. The other end of the spring 44 thus extends below the bore 24 thereby compressing or binding the line 18 (FIGS. 1 and 3) tightly against the portion 40 of the stem 16. Thus, the line 18 is held securely to the stem 16. The spring 44 frictionally engages the line 18 so as to act as a brake or drag on the line and thus the line is fixedly secured to the float. It should be noted that the end 48 of the spring 44 is preferably closed so that the line 18 will not become entangled therewith.

The bobber 14 may be of any buoyant material such as cork, balsa, plastic or the like and is preferably formed with a tapered bore 50 therethrough. The stem 16 is formed with a body portion 52 having a complementally formed taper. Thus, the bobber 14 may be fixedly seated on the stem 16 by urging the bobber 14 along the taper 52 until a tight fit is attained. To further insure a tight fit between the bobber 14 and stem 16, the stem 16 may be formed with an annular rib or detent 54 which will engage the bore 50 of the bobber 14 to provide the necessary tight fit.

Figure 6:
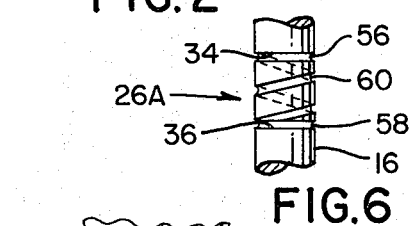
FIGS. 6 and 7 are fragmentary side elevations showing alternate locking grooves.

Another exemplary embodiment of this invention is illustrated in FIG. 6. Only a fragmentary view is illustrated showing essentially another embodiment of the locking groove, designated generally as 26A. Parts of the locking groove 26A which correspond to identical parts of the locking groove 26 will be designated with the same reference numeral. In this embodiment, a pair of grooves 56 and 58 are formed in spaced relation along the stem 16. Shoulders 34 and 36 define one dimension of the grooves 56 and 58, respectively. A threaded groove 60 connects the grooves 56 and 58. Thus, the convolution 46 of spring 44 travels along the groove 60 when it is desired to change the float from one line condition to the other line condition.

Figure 7:
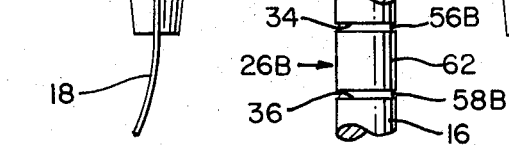

Another exemplary embodiment of this invention is illustrated in FIG. 7. Only a fragmentary view is illustrated showing essentially another locking groove as that shown in FIG. 6 and will be designated by the same reference numerals followed by the letter designation "B" and not described again. In this embodiment, the locking groove 26B comprises two grooves. The grooves 56B and 58B are formed in spaced relation on the stem 16. Shoulders 34 and 36 define one dimension of each of the grooves 56B and 58B, respectively. In this embodiment, when it is desired to change the float from one line condition to the other, the convolution 46 of spring 44 is urged out of one of the locking grooves 56B or 58B and slid along stem portion 62 until the convolution 46 seats in the other locking groove and abuts the respective shoulder 34 or 36.

It can be seen that a fishing float is provided which permits the user to secure the float to the line in a fixed line condition or in a slip line condition. Thus, this invention provides an improved fishing float which is of simple and economical construction, is easy to use and move from one condition to the other condition and, accordingly, accomplishes the objectives hereinbefore set forth.

While a present exemplary embodiment of this invention has been illustrated and described, it will be recognized that this invention may be otherwise variously embodied and practiced by those skilled in the art.

What is claimed is:

1. A fishing float having a fixed line and a slip line condition, said float comprising: a stem, a buoyant member secured to said stem intermediate the ends thereof, an axial line receiving slot in said stem, said stem having a transverse lateral slot opening thereinto, a spring mounted exteriorly about said stem and cooperating with said slot, said float having means thereon to provide one end of said spring with a first fixed axial position and a second fixed axial position relative to said slot wherein the float is in a fixed line condition when said one end of said spring is in the first position and wherein the float is in a slip line condition when said one end of said spring is in the second position.

2. The fishing float according to claim 1 wherein said float means comprises locking means on said stem for maintaining said spring in said first and second positions.

3. The fishing float according to claim 2 in which said locking means is a groove formed in said stem between said slot and said buoyant member, said groove having first and second spring engaging shoulders axially displaced along said stem and in which said spring has convolutions at said one end for cooperative engagement with said groove shoulders in the first and second spring positions, said spring having convolutions at the other end of said spring extending beyond the line retaining end of said receiving slot for frictionally pressing a line to the stem when said spring is in the first position.

4. The fishing float according to claim 3 in which the line engaging convolutions of said spring are positioned to end short of the line retaining end of said receiving slot in the second position wherein the line may freely slide through said slot.

5. The fishing float according to claim 4 further comprising means in said groove urging said groove engaging spring convolutions into engagement with said shoulders.

6. The fishing float according to claim 5 in which said means is tapered stem portions formed in said groove between said shoulders, said tapered portions having a high point axially between said shoulders and decreasing in dimension towards said respective shoulders wherein said tapered portions hold said groove engaging spring convolutions against said shoulder.

7. The fishing float according to claim 3 in which said groove includes first and second grooves axially spaced along said stem, said first and second shoulders defining one dimension of said respective grooves wherein said spring convolutions at said one end are seated in one groove in the fixed line condition and in the other groove in the slip line condition.

8. The fishing float according to claim 7 further comprising a threaded groove formed in said stem between said first and second grooves wherein said spring convolutions at said one end move in said threaded groove when said spring is axially moved from one position to the other position.

9. The fishing float according to claim 4 in which said spring is moved from one position to another position by axially urging said groove engaging spring convolutions away from the one shoulder to engage the other shoulder.

10. The fishing float according to claim 1 in which said buoyant member is formed with a tapered bore therethrough, and in which said stem is formed with a complementally shaped taper, said stem including an annular rib formed about the complementally shaped portion wherein said buoyant member is fixedly seated on said stem by relatively sliding said stem and said buoyant member until said annular rib frictionally engages said buoyant member tapered bore.

11. A fishing float having a fixed line and a slip line condition, said float comprising: an elongate substantially cylindrical stem, a buoyant member secured to said stem, an axial line receiving slot formed longitudinally along said stem and having a lateral slot opening thereinto, lock means formed in said stem between said slot and said buoyant member, said lock means having a first shoulder and a second shoulder, a coiled spring mounted exteriorly about said stem in cooperation with said longitudinal slot, one end of said spring being mounted in said lock means in a first position wherein the other end of said spring extends beyond the end of said line receiving slot to frictionally press a line passing therethrough against said stem when said spring abuts one shoulder whereby a fixed line condition is provided and wherein the other end of said spring ends intermediate the ends of the said longitudinal line receiving slot when said spring one end engages the other shoulder in a second position wherein a line can pass through said line receiving slot unimpeded.

12. The fishing float according to claim 11 in which said lock means is a tapered lock groove, said tapered lock groove having a first tapered surface decreasing in diameter from a high point to said first shoulder and a second tapered portion decreasing in diameter from said high point to said second shoulder, said first and second shoulders, having an outer diameter greater than the high point of said groove.

13. The fishing float according to claim 11 in which said lock means includes a pair of annular grooves formed in spaced relation one to the other along said stem.

14. The fishing float according to claim 13 further comprising a threaded groove formed in said stem between said first and second grooves providing a travel path for said spring convolutions between said first and second grooves.

* * * * *